US012750824B2

(12) United States Patent
Lin

(10) Patent No.: US 12,750,824 B2
(45) Date of Patent: Sep. 29, 2026

(54) APPARATUS AND METHOD OF WIRELESS COMMUNICATION

(71) Applicant: GUANGDONG OPPO MOBILE TELECOMMUNICATIONS CORP., LTD., Dongguan (CN)

(72) Inventor: Hao Lin, Neuilly-sur-Seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 313 days.

(21) Appl. No.: 18/368,816

(22) Filed: Sep. 15, 2023

(65) Prior Publication Data

US 2024/0008012 A1 Jan. 4, 2024

Related U.S. Application Data

(63) Continuation of application No. PCT/IB2021/000213, filed on Mar. 18, 2021.

(51) Int. Cl.
*H04W 72/0446* (2023.01)
*H04W 72/231* (2023.01)

(52) U.S. Cl.
CPC ..... *H04W 72/0446* (2013.01); *H04W 72/231* (2023.01)

(58) Field of Classification Search
None
See application file for complete search history.

(56) References Cited

U.S. PATENT DOCUMENTS

| | | | | |
|---|---|---|---|---|
| 2019/0098524 | A1 | 3/2019 | Yiu | |
| 2019/0350039 | A1 | 11/2019 | June | |
| 2021/0212154 | A1 | 7/2021 | Yan | |
| 2021/0345146 | A1* | 11/2021 | He | H04L 5/005 |
| 2022/0182961 | A1* | 6/2022 | Dai | H04W 56/0045 |
| 2022/0385442 | A1* | 12/2022 | Luo | H04L 5/0048 |
| 2022/0417889 | A1* | 12/2022 | Liberg | H04W 56/002 |
| 2023/0180174 | A1* | 6/2023 | Yerramalli | H04W 72/231 455/456.3 |
| 2023/0261838 | A1* | 8/2023 | Dai | H04W 56/0035 |
| 2023/0362857 | A1* | 11/2023 | Ghanbarinejad | H04W 56/0045 |
| 2023/0403055 | A1* | 12/2023 | Bhamri | H04W 74/0808 |

FOREIGN PATENT DOCUMENTS

| | | | |
|---|---|---|---|
| WO | 2018119756 | A1 | 7/2018 |
| WO | 2020092732 | A1 | 5/2020 |
| WO | 2021032305 | A1 | 2/2021 |

OTHER PUBLICATIONS

Ericsson: "On UL time and frequency synchronization enhancements for NTN", 3GPP Draft; R1-2005502, 3rd Generation Partnership Project (3GPP), Mobile Competence Centre; 650, Route Des Lucioles; F-06921 Sophia-Antipolis Cedex; France vol. Ran WG1, No. e-Meeting; Aug. 17, 2020-Aug. 28, 2020, Aug. 7, 2020 (Aug. 7, 2020), XP051917511, the whole document. 11 pages.

(Continued)

*Primary Examiner* — Duc T Duong
(74) *Attorney, Agent, or Firm* — BAYES PLLC

(57) ABSTRACT

A wireless communication method, a user equipment (UE) and a base station are provided. The method by the UE includes determining a first gap and performing a first transmission, wherein the first transmission is relevant to the first gap.

20 Claims, 4 Drawing Sheets

(56) References Cited

OTHER PUBLICATIONS

International Search Report in the international application No. PCT/IB2021/000213, mailed on Dec. 22, 2021. 5 pages.
Written Opinion of the International Search Authority in the international application No. PCT/IB2021/000213, mailed on Dec. 22, 2021. 10 pages.
3GPP TR 38.821 v16.0.0 (Dec. 2019), 3rd Generation Partnership Project; Technical Specification Group Radio Access Network; Solutions for NR to support non-terrestrial networks (NTN) (Release 16). section 6.2. 140 pages.

* cited by examiner

APPARATUS AND METHOD OF WIRELESS COMMUNICATION

CROSS-REFERENCE TO RELATED APPLICATION(S)

This application is a continuation of International Patent Application No. PCT/IB2021/000213 filed on Mar. 18, 2021, the entire contents of which are incorporated herein by reference in its entirety.

BACKGROUND

Non-terrestrial networks (NTNs) refer to networks, or segments of networks, using a spaceborne vehicle or an airborne vehicle for transmission. Spaceborne vehicles include satellites including low earth orbiting (LEO) satellites, medium earth orbiting (MEO) satellites, geostationary earth orbiting (GEO) satellites, and highly elliptical orbiting (HEO) satellites. Airborne vehicles include high altitude platforms (HAPs) encompassing unmanned aircraft systems (UAS) including lighter than air (LTA) unmanned aerial systems (UAS) and heavier than air (HTA) UAS, all operating in altitudes typically between 8 and 50 km, quasi-stationary.

Communication via a satellite is an interesting means thanks to its well-known coverage, which can bring the coverage to locations that normally cellular operators are not willing to deploy either due to non-stable crowd potential client, e.g., extremely rural, or due to high deployment cost, e.g., middle of ocean or mountain peak. Nowadays, the satellite communication is a separate technology to a 3rd generation partnership project (3GPP) cellular technology. Coming to 5G era, these two technologies can merge together, i.e., we can imagine having a 5G terminal that can access to a cellular network and a satellite network. The NTN can be good candidate technology for this purpose. It is to be designed based on 3GPP new radio (NR) with necessary enhancement.

In NTN, different satellite deployment scenarios can be used. When LEO satellite is deployed, the satellite velocity can augment up to more than 7 km/s, which is greatly beyond a maximum mobility speed experienced in a terrestrial network, e.g., high speed train has a maximum speed of 500 km/h. For this reason, a transmitter as well as a receiver will face a much wider range of Doppler shift. This Doppler shift, due to high velocity of satellite motion, will become a severe issue to be addressed in the NTN network. However, in the legacy terrestrial, there is no specified work on the Doppler shift mitigation. Further, in NTN, due to the high velocity of the satellite as well as a half-duplex of internet of things (IoT) device, there is a need for designing a gap in which a user equipment (UE) may perform a synchronization, a timing advance adjustment, or a GNSS measurement.

Therefore, there is a need for an apparatus (such as a user equipment (UE) and/or a base station) and a method of wireless communication, which can solve issues in the prior art, provide a gap in which the UE may perform a synchronization, a timing advance adjustment, or a global navigation satellite system (GNSS) measurement, provide a good communication performance, and/or provide high reliability.

SUMMARY

The present disclosure relates to the field of communication systems, and proposes an apparatus (such as a user equipment (UE) and/or a base station) and a method of wireless communication.

In a first aspect of the present disclosure, a method of wireless communication by a user equipment (UE) comprises determining a first gap and performing a first transmission, wherein the first transmission is relevant to the first gap.

In a second aspect of the present disclosure, a method of wireless communication by a base station comprises configuring a first gap to a user equipment (UE) and performing a first transmission, wherein the first transmission is relevant to the first gap.

In a third aspect of the present disclosure, a user equipment comprises a memory, a transceiver, and a processor coupled to the memory and the transceiver. The processor is configured to determine a first gap, and the processor is configured to perform a first transmission, wherein the first transmission is relevant to the first gap.

In a fourth aspect of the present disclosure, a base station comprises a memory, a transceiver, and a processor coupled to the memory and the transceiver. The processor is configured to configure a first gap to a user equipment (UE), and the processor is configured to perform a first transmission, wherein the first transmission is relevant to the first gap.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Internet of things (IoT) operation is critical in remote areas with low/no cellular connectivity for many different industries, including e.g., transportation (maritime, road, rail, air) and logistics, solar, oil, and gas harvesting, utilities, farming, environment monitoring, mining, etc. Capabilities of NB-IoT are a good fit to the above, but will require satellite connectivity to provide coverage beyond terrestrial deployments, where IoT connectivity is required. There is an urgent need for a standardized solution allowing global IoT operation anywhere on Earth, in view of other solutions already available. It is important that satellite NB-IoT be defined in a complementary manner to terrestrial deployments.

Figure 1A:
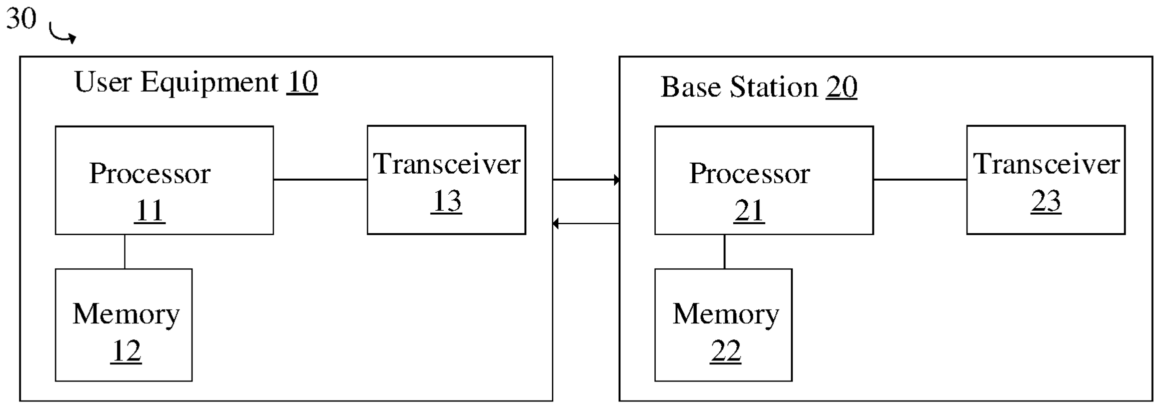
FIG. 1A is a block diagram of one or more user equipments (UEs) and a base station (e.g., gNB or eNB) of communication in a communication network system (e.g., non-terrestrial network (NTN) or a terrestrial network) according to an embodiment of the present disclosure.

FIG. 1A illustrates that, in some embodiments, one or more user equipments (UEs) 10 and a base station (e.g., gNB or eNB) 20 for transmission adjustment in a communication network system 30 (e.g., non-terrestrial network (NTN) or terrestrial network) according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

Figure 1B:
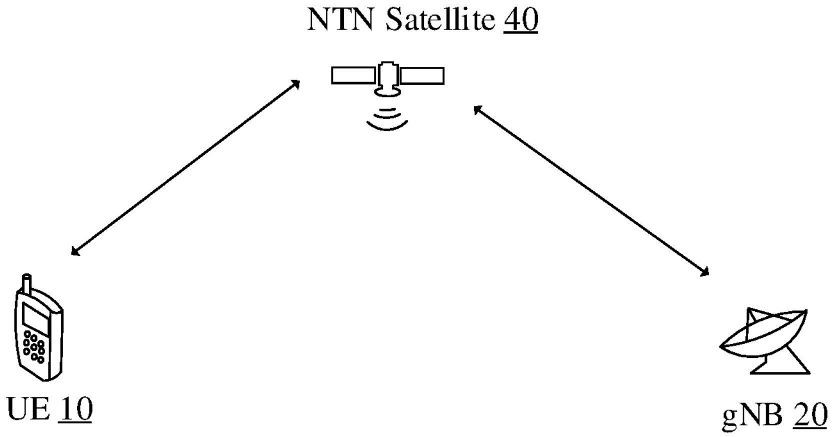
FIG. 1B is a block diagram of one or more user equipments (UEs) and a base station (e.g., gNB or eNB) of communication in a non-terrestrial network (NTN) system according to an embodiment of the present disclosure.

In some embodiments, the communication between the UE 10 and the base station 20 comprises non-terrestrial network (NTN) communication. In some embodiments, the base station 20 comprises a spaceborne platform or an airborne platform or a high-altitude platform station. The base station 20 can communicate with the UE 10 via a spaceborne platform or an airborne platform, e.g., NTN satellite 40, as illustrated in FIG. 1B.

Spaceborne platform includes satellite and the satellite includes low earth orbiting (LEO) satellite, medium earth orbiting (MEO) satellite and geostationary earth orbiting (GEO) satellite. While the satellite is moving, the LEO and MEO satellite is moving with regard to a given location on earth. However, for GEO satellite, the GEO satellite is relatively static with regard to a given location on earth.

In some embodiments, the processor 11 is configured to determine a first gap, and the processor 11 is configured to perform a first transmission, wherein the first transmission is relevant to the first gap. This can solve issues in the prior art, provide a gap in which the UE may perform a synchronization, a timing advance adjustment, or a global navigation satellite system (GNSS) measurement, provide a good communication performance, and/or provide high reliability. Further, some embodiments provide some methods for dealing with Doppler shift issue and/or some method for defining satellite NB-IoT in a complementary manner to terrestrial deployments.

In some embodiments, the processor 21 is configured to configure a first gap to the UE 10, and the processor 21 is configured to perform a first transmission, wherein the first transmission is relevant to the first gap. This can solve issues in the prior art, provide a gap in which the UE may perform a synchronization, a timing advance adjustment, or a global navigation satellite system (GNSS) measurement, provide a good communication performance, and/or provide high reliability. Further, some embodiments provide some methods for dealing with Doppler shift issue and/or some method for defining satellite NB-IoT in a complementary manner to terrestrial deployments.

Figure 2:
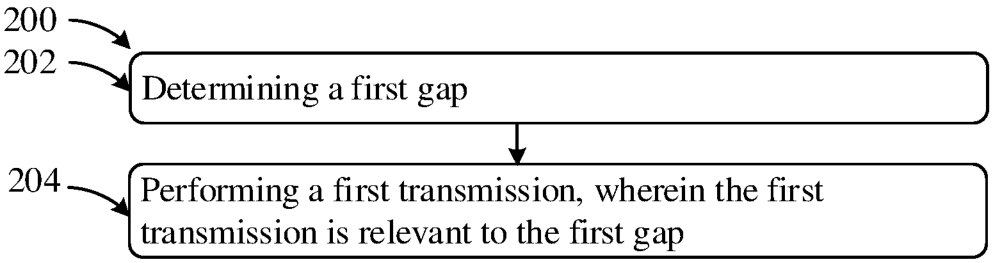
FIG. 2 is a flowchart illustrating a method of wireless communication performed by a user equipment (UE) according to an embodiment of the present disclosure.

FIG. 2 illustrates a method 200 of wireless communication by a user equipment (UE) according to an embodiment of the present disclosure. In some embodiments, the method 200 includes: a block 202, determining a first gap, and a block 204, performing a first transmission, wherein the first transmission is relevant to the first gap. This can solve issues in the prior art, provide a gap in which the UE may perform a synchronization, a timing advance adjustment, or a global navigation satellite system (GNSS) measurement, provide a good communication performance, and/or provide high reliability. Further, some embodiments provide some methods for dealing with Doppler shift issue and/or some method for defining satellite NB-IoT in a complementary manner to terrestrial deployments.

Figure 3:
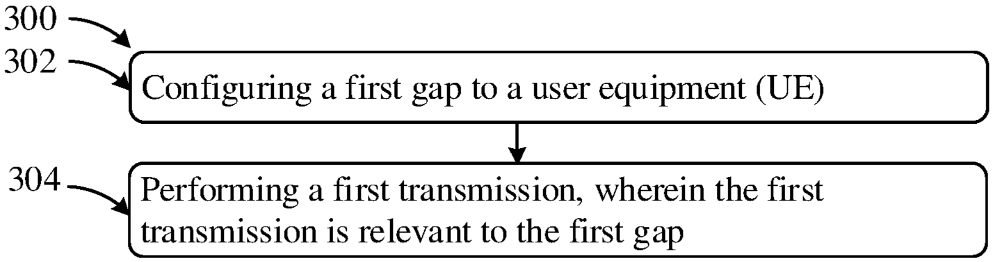
FIG. 3 is a flowchart illustrating a method of wireless communication performed by a base station according to an embodiment of the present disclosure.

FIG. 3 illustrates a method 300 of wireless communication by a base station according to an embodiment of the present disclosure. In some embodiments, the method 300 includes: a block 302, configuring a first gap to a user equipment (UE), and a block 304, performing a first transmission, wherein the first transmission is relevant to the first gap. This can solve issues in the prior art, provide a gap in which the UE may perform a synchronization, a timing advance adjustment, or a global navigation satellite system (GNSS) measurement, provide a good communication performance, and/or provide high reliability. Further, some embodiments provide some methods for dealing with Doppler shift issue and/or some method for defining satellite NB-IoT in a complementary manner to terrestrial deployments.

In some embodiments, the first gap comprises a first starting location and/or a first length and/or a first period. In some embodiments, the first gap is pre-configured or pre-defined. In some embodiments, the first gap comprises a second gap and/or a third gap. In some embodiments, the second gap comprises a second starting location and/or a second length and/or a second period. In some embodiments, the second starting location and/or the second length and/or the second period is relevant to a second transmission. In some embodiments, the second transmission comprises a first downlink transmission. In some embodiments, the first downlink transmission comprises at least one of the followings: a downlink reference signal, a physical downlink shared channel (PDSCH), a narrowband PDSCH (NPDSCH), a physical downlink control channel (PDCCH), or a narrowband PDCCH (NPDCCH). In some embodiments, the downlink reference signal comprises at least one of the followings: a downlink synchronization signal, a narrowband primary synchronization signal (NPSS), a PSS, a narrowband secondary synchronization signal (NSSS), a SSS, a common reference signal (CRS), and a narrowband reference signal (NRS). In some embodiments, the PDSCH carries a system information. In some embodiments, the system information is relevant to a satellite information.

In some embodiments, the system information is used for the UE to determine a timing advance. In some embodiments, the satellite information comprises an ephemeris data and/or a system information block (SIB) signal for ephemeris data. In some embodiments, the second transmission is within the second gap in time domain. In some embodiments, the second length is relevant to a time duration. In some embodiments, the time duration comprises a timing advance variation. In some embodiments, the timing advance variation is pre-configured or pre-defined. In some embodiments, the second starting location and/or the second length and/or the second period is pre-configured or pre-defined. In some embodiments, the third gap comprises a third starting location and/or a third length and/or a third period. In some embodiments, the third gap comprises a global navigation satellite system (GNSS) window. In some embodiments, the GNSS window is used for the UE to perform a GNSS measurement and/or performing a mode switching from a first communication device to a second communication device and/or a mode switching from the second communication device to the first communication device and/or performing a mode switching from a first phase to a second phase and/or a mode switching from the second phase to the first phase.

In some embodiments, the first communication device comprises a 3rd generation partnership project (3GPP) internet of things (IoT) device, and/or the second communication device comprises a non-3GPP IoT device. In some embodiments, the first communication device comprises a non-3GPP IoT device, and/or the second communication device comprises a 3GPP IoT device. In some embodiments, performing the first transmission comprises receiving a second downlink transmission and/or transmitting a first uplink transmission. In some embodiments, the second downlink transmission comprises a NPDCCH reception and/or a NPDSCH reception. In some embodiments, the first uplink transmission comprises a narrowband physical uplink shared channel (NPUSCH) transmission. In some embodiments, the first starting location is relevant to the second transmission, and the second transmission comprises a third downlink transmission and/or a second uplink transmission. In some embodiments, the third downlink transmission comprises a narrowband wake up signal (NWUS) transmission and/or a NPDSCH transmission. In some embodiments, the second uplink transmission comprises a NPUSCH transmission. In some embodiments, the first gap separates the first transmission and the second transmission.

In some embodiments, the first gap starts after an end location of the second transmission and/or ends before a starting location of the first transmission. In some embodiments, the UE does not perform a downlink reception from a base station and/or an uplink transmission to the base station within the GNSS window. In some embodiments, the first gap is a union of the second gap and the third gap when the second gap is overlapped or partial overlapped with the third gap. In some embodiments, the second gap comprises at least one SIB period and/or the second gap comprises at least one downlink reference signal period. In some embodiments, the GNSS measurement comprises reading a GNSS signal and/or a GNSS satellite ephemeris and/or a GNSS almanac message. In some embodiments, the GNSS signal comprises a GNSS satellite status information. In some embodiments, the GNSS window is pre-configured or pre-defined. In some embodiments, the GNSS window is defined with at least one of the followings: a GNSS window starting location, a GNSS window duration, or a GNSS window period. In some embodiments, the GNSS window covers at least one of the followings: a duration of the GNSS measurement and/or a duration of the mode switching from the first communication device to the second communication device and/or a duration of the mode switching from the second communication device to the first communication device.

In some embodiments, the duration of the mode switching from the first communication device to the second communication device is equal to the duration of the mode switching from the second communication device to the first communication device and/or the duration of the mode switching from the first phase to the second phase is equal to the duration of the mode switching from the second phase to the first phase. In some embodiments, the duration of the mode switching from the first communication device to the second communication device is different from the duration of the mode switching from the second communication device to the first communication device and/or the duration of the mode switching from the first phase to the second phase is different from the duration of the mode switching from the second phase to the first phase. In some embodiments, the duration of the GNSS measurement, the duration of the mode switching from the first communication device to the second communication device, and/or the duration of the mode switching from the second communication device to the first communication device and/or the duration of the mode switching from the first phase to the second phase and/or the duration of the mode switching from the second phase to the first phase is pre-configured, pr-defined, or depends on a UE capability. In some embodiments, the first phase comprises that an operation mode for NTN-IOT is active and/or the second phase comprises that an operation mode for GNSS is active. In some embodiments, the operation mode for NTN-IOT and the operation mode for GNSS are active at the same time.

In some embodiments, the GNSS window is equal to 0.5 second or an integer of seconds.

Figure 4:
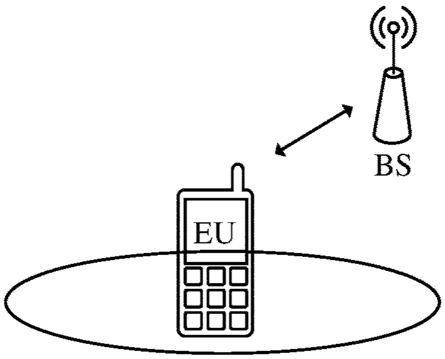
FIG. 4 is a schematic diagram illustrating a communication system including a base station (BS) and a UE according to an embodiment of the present disclosure.

FIG. 4 illustrates a communication system including a base station (BS) and a UE according to another embodiment of the present disclosure. Optionally, the communication system may include more than one base station, and each of the base stations may connect to one or more UEs. In this disclosure, there is no limit. As an example, the base station illustrated in FIG. 1A may be a moving base station, e.g., spaceborne vehicle (satellite) or airborne vehicle (drone). The UE can transmit transmissions to the base station and the UE can also receive the transmission from the base station. Optionally, not shown in FIG. 4, the moving base station can also serve as a relay which relays the received transmission from the UE to a ground base station or vice versa.

Spaceborne platform includes satellite and the satellite includes LEO satellite, MEO satellite and GEO satellite. While the satellite is moving, the LEO and MEO satellite is moving with regards to a given location on earth. However, for GEO satellite, the GEO satellite is relatively static with regards to a given location on earth. A moving base station or satellite, e.g., in particular for LEO satellite or drone, communicates with a user equipment (UE) on the ground. Due to long distance between the UE and the base station on satellite, the beamformed transmission is needed to extend the coverage.

Figure 5:
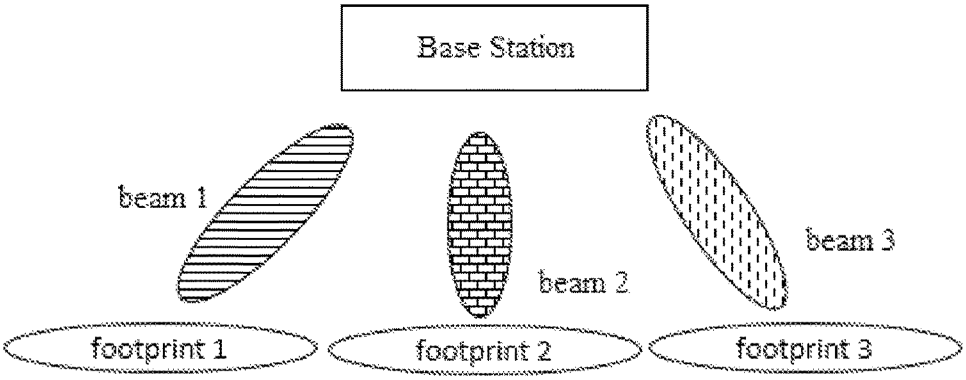
FIG. 5 is a schematic diagram illustrating that a BS transmits 3 beams to the ground forming 3 footprints according to an embodiment of the present disclosure.

Optionally, as illustrated in FIG. 5, where a base station is integrated in a satellite or a drone, and the base station transmits one or more beams to the ground forming one or more coverage areas called footprint. In FIG. 5, an example illustrates that the BS transmits three beams (beam 1, beam 2 and beam 3) to form three footprints (footprint 1, 2 and 3), respectively. Optionally, 3 beams are transmitted at 3 different frequencies. In this example, the bit position is associated with a beam. FIG. 5 illustrates that, in some embodiments, a moving base station, e.g., in particular for LEO satellite or drone, communicates with a user equipment (UE) on the ground. Due to long distance between the UE and the base station on satellite, the beamformed transmission is needed to extend the coverage. As illustrated in FIG. where a base station is transmitting three beams to the earth forming three coverage areas called footpoints. Moreover, each beam may be transmitted at dedicated frequencies so that the beams for footprint 1, 2 and 3 are non-overlapped in a frequency domain. The advantage of having different frequencies corresponding to different beams is that the inter-beam interference can be minimized.

Example 1

Figure 6:
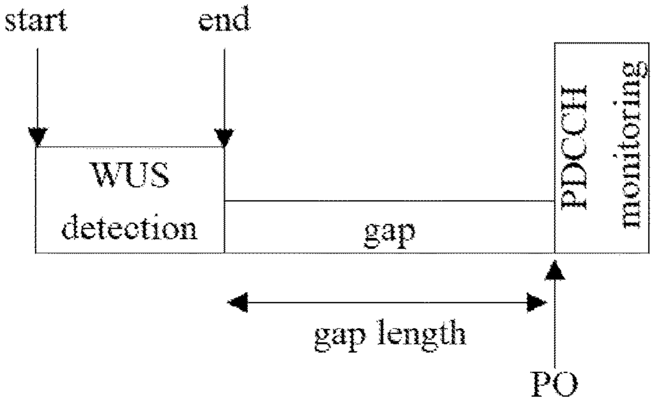
FIG. 6 is a schematic diagram illustrating that a UE is configured to adjust a synchronization during a gap between a wake up signal (NWUS) and a paging occasion (PO) according to an embodiment of the present disclosure.
Figure 7:
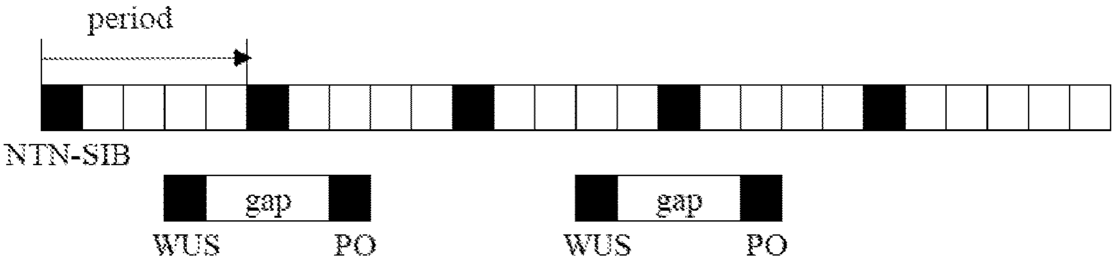
FIG. 7 is a schematic diagram illustrating that within a gap a UE expects to receive at least one NTN-SIB signal for NTN satellite ephemeris data according to an embodiment of the present disclosure.
Figure 8:
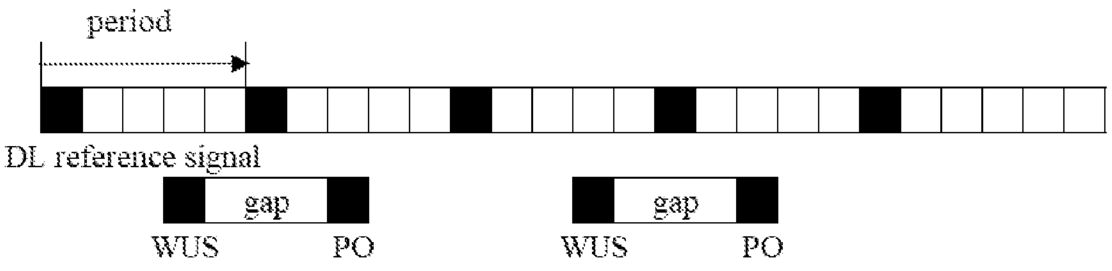
FIG. 8 is a schematic diagram illustrating that within a gap a UE expects to receive at least one downlink synchronization signal according to an embodiment of the present disclosure.

FIG. 6 illustrates that a UE is configured to adjust a synchronization during a gap between a wake up signal (NWUS) and a paging occasion (PO) according to an embodiment of the present disclosure. FIG. 7 illustrates that within a gap a UE expects to receive at least one NTN-SIB signal for NTN satellite ephemeris data according to an embodiment of the present disclosure. FIG. 8 illustrates that within a gap a UE expects to receive at least one downlink synchronization signal according to an embodiment of the present disclosure. FIG. 6 to FIG. 8 illustrate that, in some embodiments, for a UE, it needs to monitor a paging message. The UE monitors the paging message in a paging occasion (PO). However, in order to reduce a UE power consumption, a network (such as a base station) will first transmit a wake up signal (WUS) before the PO. The WUS is transmitted in a WUS detection window, which has a starting location and the end location. Thus, the UE will first detect if there is a WUS transmitted in the WUS detection window. When the UE detects the WUS, the UE will adjust synchronization during a gap between the WUS and the PO as illustrated in FIG. 6. The gap starts after the WUS detection window and ends before the PO. The UE adjusts its downlink (DL) synchronization and/or uplink (UL) synchronization within the gap. Optionally, within the gap, the UE expects to receive at least one NTN-SIB signal for NTN satellite ephemeris data and/or one downlink synchronization signal (e.g., PSS or NPSS or SSS or NSSS or CRS or NRS) as illustrated in FIG. 7 and FIG. 8.

In some examples, the way of ensuring the UE can receive at least one DL reference signal and/or NTN-SIB signal within the gap is that the starting location and the gap length are configured such that the gap includes at least one NTN-SIB period and/or the gap includes at least one DL reference period. In some examples, the gap starting location is derived from the WUS location.

Example 2

Figure 9:
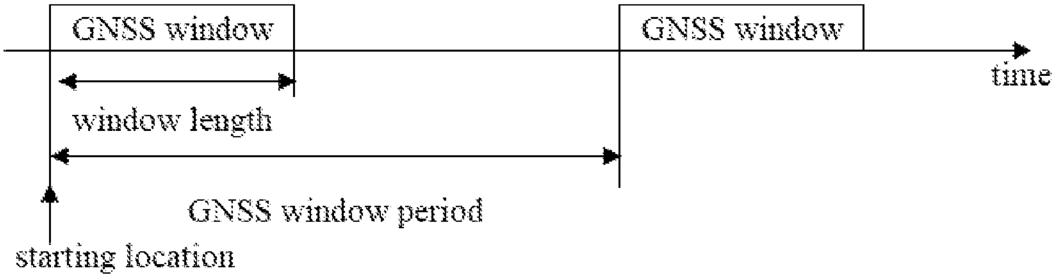
FIG. 9 is a schematic diagram illustrating that a GNSS window according to an embodiment of the present disclosure.

FIG. 9 illustrates that a GNSS window according to an embodiment of the present disclosure. FIG. 9 illustrates that, in this example, a UE needs to perform a GNSS measurement within a gap. The GNSS measurement includes reading GNSS signal and/or GNSS satellite ephemeris and/or GNSS almanac message. The GNSS signal further includes GNSS satellite status information. In this example, we denote the gap used for GNSS measurement as GNSS window. The GNSS window may be configured by the network or pre-defined. The GNSS window is defined with at least one of the followings: a GNSS window starting location, a GNSS window duration, or a GNSS window period as illustrated in FIG. 9. Optionally, the GNSS window is configured or pre-defined such that the window length covers at least one of the followings: a duration for module transition, or a duration for GNSS measurement.

Figure 10:
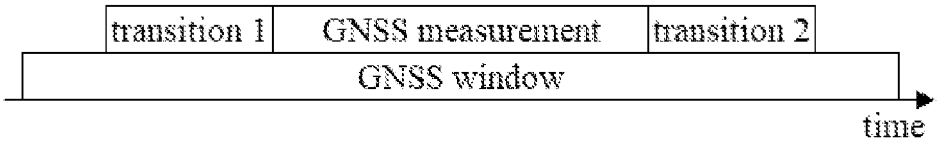
FIG. 10 is a schematic diagram illustrating that a GNSS window according to an embodiment of the present disclosure.
Figure 11:
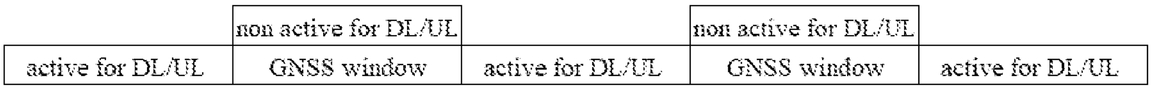
FIG. 11 is a schematic diagram illustrating that a GNSS window according to an embodiment of the present disclosure.

FIG. 10 illustrates that a GNSS window according to an embodiment of the present disclosure. FIG. 10 illustrate that, in some embodiments, a GNSS window includes three parts: a duration for transition 1, a duration for GNSS measurement, and a duration for transition 2. The transition 1 stands for the time duration needed for the UE to switch from module 1 (such as first communication device) to module 2 (such as second communication device). One example of the module 1 is 3GPP technology module such as NB-IoT, NTN-IoT, or NR-IoT modules. While the module 2 is GNSS system module which is activated to perform GNSS measurement. The transition 2 stands for the time duration needed for the UE to switch back from module 2 to module 1. Optionally, the duration for transition 1 is equal to the duration for transition 2. Optionally, the durations of transition 1 and/or transition 2 and/or GNSS measurement may be pre-defined. Optionally, the durations of transition 1 and/or transition 2 and/or GNSS measurement may be depending on UE capability. For example, there are multiple candidate durations pre-defined, and UE reports to the network (or called base station) which candidate duration or candidate durations are supported by the UE. It is noted that the GNSS window may be longer than the summed duration of transition 1 and GNSS measurement duration and the duration of transition 2. Optionally, a first transition time for the UE is switched from a first phase to a second phase, or a transition time for a UE is switched from the second phase to the first phase. In some examples, the first phase is the operation mode for NTN-IoT which is active. The second phase is the operation mode for GNSS which is active. In some examples, the first transition time is equal to the second transition time. In some examples, the NTN-IoT operation mode and the GNSS operation mode cannot be active at the same time. FIG. 11 illustrates that a GNSS window according to an embodiment of the present disclosure. FIG. 11 illustrates that, in some examples, the UE does not receive DL transmissions and/or does not transmit UL transmissions within the GNSS window. In some examples, the GNSS window is 0.5 second or an integer of seconds.

Example 3

Figure 12:
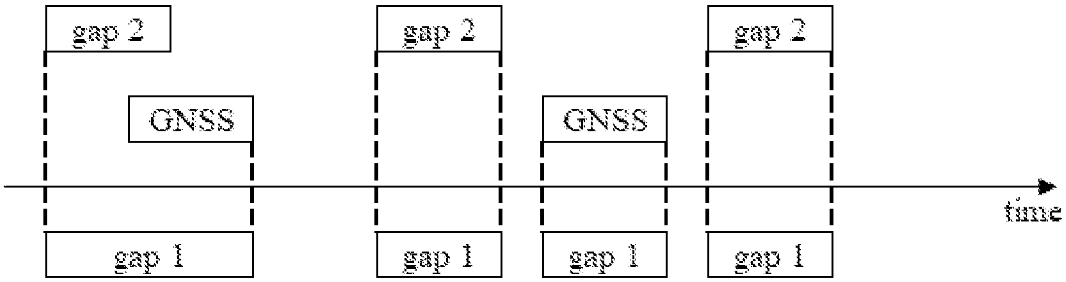
FIG. 12 is a schematic diagram illustrating that a GNSS window according to an embodiment of the present disclosure.

FIG. 12 illustrates that a GNSS window according to an embodiment of the present disclosure. FIG. 12 illustrates that, in some examples, a UE performs an uplink transmission according to a first gap (gap 1), wherein the first gap comprises a second gap (gap 2) and/or a GNSS window. The second gap is such as the gap presented in the example 1 and the GNSS window is such as presented in example 2. In some cases, the gap 2 and the GNSS window are separately configured or pre-defined. Assume that the gap 2 and the GNSS window have different periods, as illustrated in FIG. 12, then the UE determines a gap 1 which is either the gap 2 or the GNSS window or the union of the gap 2 and the GNSS window. Optionally, the gap 1 can be explicitly configured by the network or pre-defined without involving the gap 2 and/or the GNSS window.

Example 4

Figure 13:
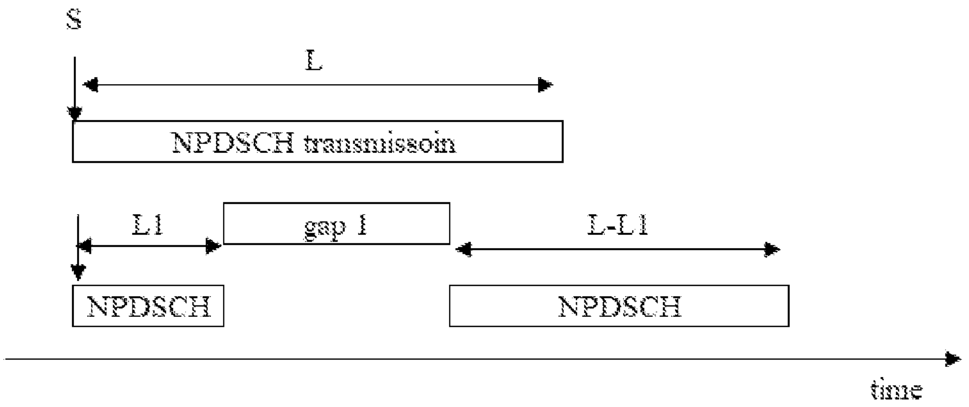
FIG. 13 is a schematic diagram illustrating that a transmission is transmitted by avoiding a gap according to an embodiment of the present disclosure.

FIG. 13 illustrates that a transmission is transmitted by avoiding a gap according to an embodiment of the present disclosure. FIG. 13 illustrates that, in some embodiments, a network may configure different gap durations, one including GNSS measurement window and another not including GNSS measurement window. When the gap 1 is configured by the network, the network can configure at least one of the followings: a starting location, a gap length, or a gap period. Optionally, the starting location, the gap length, or the gap period may be pre-defined. In FIG. 13, the network configures a gap 1 and the UE performs the downlink data reception and/or the uplink data transmission according to the gap 1. For instance, for the UE performing DL PDSCH or NPDSCH reception, the scheduled data transmission (e.g., NPDSCH) starts from symbol S and it has a length of L, where L may have a unit of subframes or slots. When the UE finds that it collides with the gap 1 in the time domain, the UE will assume that the NPDSCH transmission is transmitted by avoiding the gap 1. The UE assumes that the data transmission is not within the gap 1.

Figure 14:
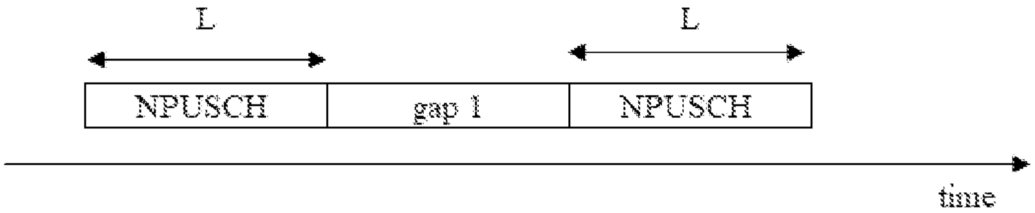
FIG. 14 is a schematic diagram illustrating that a transmission is transmitted by avoiding a gap according to an embodiment of the present disclosure.

FIG. 14 illustrates that a transmission is transmitted by avoiding a gap according to an embodiment of the present disclosure. FIG. 14 illustrates that, in some embodiments, when a UE performs an uplink transmission, the UE avoid the uplink transmission in the gap 1. When the UE performs continuous uplink transmissions, e.g., NPUSCH repetitions. The UE avoids the uplink transmissions in the gap 1 as in the above example of the downlink reception. In some examples, the location of the gap 1 is pre-defined. For instance, the UE inserts a gap 1 for an uplink duration beyond a pre-defined threshold. Let us assume that the threshold is L, which has a unit of subframe or slot or absolute time (millisecond). Once the UL transmission duration is beyond L, the UE inserts a gap 1 after an uplink transmission of duration L, as illustrated in FIG. 14. Optionally, the UE adjusts its timing advance within the gap 1 and apply the adjusted timing advance for the next uplink transmission, e.g., in FIG. 14 applying the adjusted timing advance to the later NPUSCH. Thus, the length of the gap 1 covers the maximum timing advance variation so that later NPUSCH with the adjusted timing advance will not overlap with the previous NPUSCH.

Example 5

When a UE performs uplink transmissions, a network may configure a gap during the UL transmission. For example, when a UE performs a UL transmission and if the UL transmission duration is beyond a threshold (L), then the UE will stop the UL transmission at L, and create a gap of length (G), then resume the UL transmission after the gap. The threshold L may be pre-defined or pre-configured by the network. The threshold L is in unit of subframe or frame or absolute time such as millisecond.

It is to note that some of the examples presented previously may not be mutual exclusive and may be combined together. Thus, we do not give further examples for such combinations.

Commercial interests for some embodiments are as follows. 1. Solving issues in the prior art. 2. Providing a gap in which the UE may perform a synchronization, a timing advance adjustment, or a global navigation satellite system (GNSS) measurement. 3. Providing a good communication performance 4. Providing a high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. The deployment scenarios include, but not limited to, indoor hotspot, dense urban, urban micro, urban macro, rural, factor hall, and indoor D2D scenarios. Some embodiments of the present disclosure are a combination of "techniques/processes" that can be adopted in 3GPP specification to create an end product. Some embodiments of the present disclosure could be adopted in 5G NR licensed and/or non-licensed or shared spectrum communications. Some embodiments of the present disclosure propose technical mechanisms.

Figure 15:
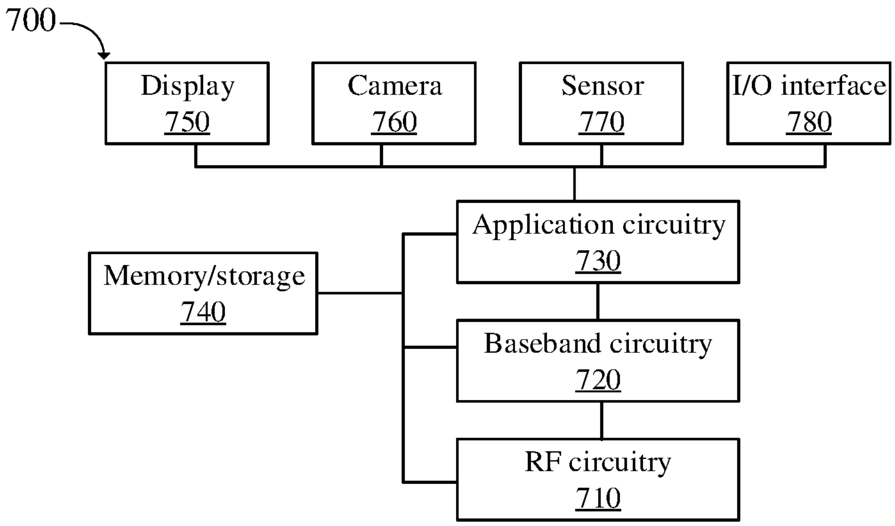
FIG. 15 is a block diagram of a system for wireless communication according to an embodiment of the present disclosure.

FIG. 15 is a block diagram of an example system 700 for wireless communication according to an embodiment of the present disclosure. Embodiments described herein may be implemented into the system using any suitably configured hardware and/or software. FIG. 15 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

Additional Embodiments

Embodiment 1. A wireless communication method by a user equipment (UE), comprising:

determining a first gap; and performing a first transmission, wherein the first transmission is relevant to the first gap.

Embodiment 2. The method of embodiment 1, wherein the first gap comprises a first starting location and/or a first length and/or a first period.

Embodiment 3. The method of embodiment 1 or 2, wherein the first gap is pre-configured or pre-defined.

Embodiment 4. The method of any one of embodiments 1 to 3, wherein the first gap comprises a second gap and/or a third gap.

Embodiment 5. The method of embodiment 4, wherein the second gap comprises a second starting location and/or a second length and/or a second period.

Embodiment 6. The method of embodiment 5, wherein the second starting location and/or the second length and/or the second period is relevant to a second transmission.

Embodiment 7. The method of embodiment 6, wherein the second transmission comprises a first downlink transmission.

Embodiment 8. The method of embodiment 7, wherein the first downlink transmission comprises at least one of the followings: a downlink reference signal, a physical downlink shared channel (PDSCH), a narrowband PDSCH (NPDSCH), a physical downlink control channel (PDCCH), or a narrowband PDCCH (NPDCCH).

Embodiment 9. The method of embodiment 8, wherein the downlink reference signal comprises at least one of the followings: a downlink synchronization signal, a narrowband primary synchronization signal (NPSS), a PSS, a narrowband secondary synchronization signal (NSSS), a SSS, a common reference signal (CRS), and a narrowband reference signal (NRS).

Embodiment 10. The method of embodiment 8 or 9, wherein the PDSCH carries a system information.

Embodiment 11. The method of embodiment 10, wherein the system information is relevant to a satellite information.

Embodiment 12. The method of embodiment 10 or 11, wherein the system information is used for the UE to determine a timing advance.

Embodiment 13. The method of embodiment 11 or 12, wherein the satellite information comprises an ephemeris data and/or a system information block (SIB) signal for ephemeris data.

Embodiment 14. The method of any one of embodiments 6 to 13, wherein the second transmission is within the second gap in time domain.

Embodiment 15. The method of any one of embodiments 5 to 14, wherein the second length is relevant to a time duration.

Embodiment 16. The method of embodiment 15, wherein the time duration comprises a timing advance variation.

Embodiment 17. The method of embodiment 16, wherein the timing advance variation is pre-configured or pre-defined.

Embodiment 18. The method of any one of embodiments 5 to 17, wherein the second starting location and/or the second length and/or the second period is pre-configured or pre-defined.

Embodiment 19. The method of any one of embodiments 4 to 18, wherein the third gap comprises a third starting location and/or a third length and/or a third period.

Embodiment 20. The method of any one of embodiments 4 to 19, wherein the third gap comprises a global navigation satellite system (GNSS) window.

Embodiment 21. The method of embodiment 20, wherein the GNSS window is used for the UE to perform a GNSS measurement and/or performing a mode switching from a first communication device to a second communication device and/or a mode switching from the second communication device to the first communication device and/or performing a mode switching from a first phase to a second phase and/or a mode switching from the second phase to the first phase.

Embodiment 22. The method of embodiment 20, wherein the first communication device comprises a 3rd generation partnership project (3GPP) internet of things (IoT) device, and/or the second communication device comprises a non-3GPP IoT device.

Embodiment 23. The method of embodiment 21 or 22, wherein the first communication device comprises a non-3GPP IoT device, and/or the second communication device comprises a 3GPP IoT device.

Embodiment 24. The method of any one of embodiments 1 to 23, wherein performing the first transmission comprises receiving a second downlink transmission and/or transmitting a first uplink transmission.

Embodiment 25. The method of embodiment 24, wherein the second downlink transmission comprises a NPDCCH reception and/or a NPDSCH reception.

Embodiment 26. The method of embodiment 24 or 25, wherein the first uplink transmission comprises a narrowband physical uplink shared channel (NPUSCH) transmission.

Embodiment 27. The method of any one of embodiments 6 to 26, wherein the first starting location is relevant to the second transmission, and the second transmission comprises a third downlink transmission and/or a second uplink transmission.

Embodiment 28. The method of embodiment 27, wherein the third downlink transmission comprises a narrowband wake up signal (NWUS) transmission and/or a NPDSCH transmission.

Embodiment 29. The method of embodiment 27 or 28, wherein the second uplink transmission comprises a NPUSCH transmission.

Embodiment 30. The method of any one of embodiments 6 to 29, wherein the first gap separates the first transmission and the second transmission.

Embodiment 31. The method of embodiment 30, wherein the first gap starts after an end location of the second transmission and/or ends before a starting location of the first transmission.

Embodiment 32. The method of any one of embodiments 20 to 31, wherein the UE does not perform a downlink reception from a base station and/or an uplink transmission to the base station within the GNSS window.

Embodiment 33. The method of any one of embodiments 4 to 32, wherein the first gap is a union of the second gap and the third gap when the second gap is overlapped or partial overlapped with the third gap.

Embodiment 34. The method of any one of embodiments 13 to 33, wherein the second gap comprises at least one SIB period and/or the second gap comprises at least one downlink reference signal period.

Embodiment 35. The method of any one of embodiments 21 to 34, wherein the GNSS measurement comprises reading a GNSS signal and/or a GNSS satellite ephemeris and/or a GNSS almanac message.

Embodiment 36. The method of embodiment 35, wherein the GNSS signal comprises a GNSS satellite status information.

Embodiment 37. The method of any one of embodiments 21 to 36, wherein the GNSS window is pre-configured or pre-defined.

Embodiment 38. The method of any one of embodiments 21 to 37, wherein the GNSS window is defined with at least one of the followings: a GNSS window starting location, a GNSS window duration, or a GNSS window period.

Embodiment 39. The method of any one of embodiments 21 to 38, wherein the GNSS window covers at least one of the followings: a duration of the GNSS measurement and/or a duration of the mode switching from the first communication device to the second communication device and/or a duration of the mode switching from the second communication device to the first communication device.

Embodiment 40. The method of embodiment 39, wherein the duration of the mode switching from the first communication device to the second communication device is equal to the duration of the mode switching from the second communication device to the first communication device and/or the duration of the mode switching from the first phase to the second phase is equal to the duration of the mode switching from the second phase to the first phase.

Embodiment 41. The method of embodiment 39, wherein the duration of the mode switching from the first communication device to the second communication device is different from the duration of the mode switching from the second communication device to the first communication device and/or the duration of the mode switching from the first phase to the second phase is different from the duration of the mode switching from the second phase to the first phase.

Embodiment 42. The method of any one of embodiments 39 to 41, wherein the duration of the GNSS measurement, the duration of the mode switching from the first communication device to the second communication device, and/or the duration of the mode switching from the second communication device to the first communication device and/or the duration of the mode switching from the first phase to the second phase and/or the duration of the mode switching from the second phase to the first phase is pre-configured, pr-defined, or depends on a UE capability.

Embodiment 43. The method of any one of embodiments 21 to 42, wherein the first phase comprises that an operation mode for NTN-IOT is active and/or the second phase comprises that an operation mode for GNSS is active.

Embodiment 44. The method of embodiment 43, wherein the operation mode for NTN-IOT and the operation mode for GNSS are active at the same time.

Embodiment 45. The method of any one of embodiments 21 to 44, wherein the GNSS window is equal to 0.5 second or an integer of seconds.

Embodiment 46. A wireless communication method by a base station, comprising:

configuring a first gap to a user equipment (UE); and performing a first transmission, wherein the first transmission is relevant to the first gap.

Embodiment 47. The method of embodiment 46, wherein the first gap comprises a first starting location and/or a first length and/or a first period.

Embodiment 48. The method of embodiment 46 or 47, wherein the first gap is pre-configured or pre-defined.

Embodiment 49. The method of any one of embodiments 46 to 48, wherein the first gap comprises a second gap and/or a third gap.

Embodiment 50. The method of embodiment 49, wherein the second gap comprises a second starting location and/or a second length and/or a second period.

Embodiment 51. The method of embodiment 50, wherein the second starting location and/or the second length and/or the second period is relevant to a second transmission.

Embodiment 52. The method of embodiment 51, wherein the second transmission comprises a first downlink transmission.

Embodiment 53. The method of embodiment 52, wherein the first downlink transmission comprises at least one of the followings: a downlink reference signal, a physical downlink shared channel (PDSCH), a narrowband PDSCH (NPDSCH), a physical downlink control channel (PDCCH), or a narrowband PDCCH (NPDCCH).

Embodiment 54. The method of embodiment 53, wherein the downlink reference signal comprises at least one of the followings: a downlink synchronization signal, a narrowband primary synchronization signal (NPSS), a PSS, a narrowband secondary synchronization signal (NSSS), a SSS, a common reference signal (CRS), and a narrowband reference signal (NRS).

Embodiment 55. The method of embodiment 53 or 54, wherein the PDSCH carries a system information.

Embodiment 56. The method of embodiment 55, wherein the system information is relevant to a satellite information.

Embodiment 57. The method of embodiment 55 or 56, wherein the system information is used for the UE to determine a timing advance.

Embodiment 58. The method of embodiment 56 or 57, wherein the satellite information comprises an ephemeris data and/or a system information block (SIB) signal for ephemeris data.

Embodiment 59. The method of any one of embodiments 51 to 58, wherein the second transmission is within the second gap in time domain.

Embodiment 60. The method of any one of embodiments 50 to 59, wherein the second length is relevant to a time duration.

Embodiment 61. The method of embodiment 60, wherein the time duration comprises a timing advance variation.

Embodiment 62. The method of embodiment 61, wherein the timing advance variation is pre-configured or pre-defined.

Embodiment 63. The method of any one of embodiments 50 to 62, wherein the second starting location and/or the second length and/or the second period is pre-configured or pre-defined.

Embodiment 64. The method of any one of embodiments 49 to 63, wherein the third gap comprises a third starting location and/or a third length and/or a third period.

Embodiment 65. The method of any one of embodiments 49 to 64, wherein the third gap comprises a global navigation satellite system (GNSS) window.

Embodiment 66. The method of embodiment 65, wherein the GNSS window is used for the UE to perform a GNSS measurement and/or performing a mode switching from a first communication device to a second communication device and/or a mode switching from the second communication device to the first communication device and/or performing a mode switching from a first phase to a second phase and/or a mode switching from the second phase to the first phase.

Embodiment 67. The method of embodiment 65, wherein the first communication device comprises a 3rd generation partnership project (3GPP) internet of things (IoT) device, and/or the second communication device comprises a non-3GPP IoT device.

Embodiment 68. The method of embodiment 66 or 67, wherein the first communication device comprises a non-3GPP IoT device, and/or the second communication device comprises a 3GPP IoT device.

Embodiment 69. The method of any one of embodiments 46 to 68, wherein performing the first transmission comprises transmitting a second downlink transmission and/or receiving a first uplink transmission.

Embodiment 70. The method of embodiment 69, wherein the second downlink transmission comprises a NPDCCH reception and/or a NPDSCH reception.

Embodiment 71. The method of embodiment 69 or 70, wherein the first uplink transmission comprises a narrowband physical uplink shared channel (NPUSCH) transmission.

Embodiment 72. The method of any one of embodiments 51 to 71, wherein the first starting location is relevant to the second transmission, and the second transmission comprises a third downlink transmission and/or a second uplink transmission.

Embodiment 73. The method of embodiment 72, wherein the third downlink transmission comprises a narrowband wake up signal (NWUS) transmission and/or a NPDSCH transmission.

Embodiment 74. The method of embodiment 72 or 73, wherein the second uplink transmission comprises a NPUSCH transmission.

Embodiment 75. The method of any one of embodiments 51 to 74, wherein the first gap separates the first transmission and the second transmission.

Embodiment 76. The method of embodiment 75, wherein the first gap starts after an end location of the second transmission and/or ends before a starting location of the first transmission.

Embodiment 77. The method of any one of embodiments 65 to 76, wherein the base station does not perform a downlink transmission to the UE and/or an uplink reception from the UE within the GNSS window.

Embodiment 78. The method of any one of embodiments 49 to 77, wherein the first gap is a union of the second gap and the third gap when the second gap is overlapped or partial overlapped with the third gap.

Embodiment 79. The method of any one of embodiments 58 to 78, wherein the second gap comprises at least one SIB period and/or the second gap comprises at least one downlink reference signal period.

Embodiment 80. The method of any one of embodiments 66 to 79, wherein the GNSS measurement comprises reading a GNSS signal and/or a GNSS satellite ephemeris and/or a GNSS almanac message.

Embodiment 81. The method of embodiment 80, wherein the GNSS signal comprises a GNSS satellite status information.

Embodiment 82. The method of any one of embodiments 66 to 81, wherein the GNSS window is pre-configured or pre-defined.

Embodiment 83. The method of any one of embodiments 66 to 82, wherein the GNSS window is defined with at least one of the followings: a GNSS window starting location, a GNSS window duration, or a GNSS window period.

Embodiment 84. The method of any one of embodiments 66 to 83, wherein the GNSS window covers at least one of the followings: a duration of the GNSS measurement and/or a duration of the mode switching from the first communication device to the second communication device and/or a duration of the mode switching from the second communication device to the first communication device.

Embodiment 85. The method of embodiment 84, wherein the duration of the mode switching from the first communication device to the second communication device is equal to the duration of the mode switching from the second communication device to the first communication device and/or the duration of the mode switching from the first phase to the second phase is equal to the duration of the mode switching from the second phase to the first phase.

Embodiment 86. The method of embodiment 84, wherein the duration of the mode switching from the first communication device to the second communication device is different from the duration of the mode switching from the second communication device to the first communication device and/or the duration of the mode switching from the first phase to the second phase is different from the duration of the mode switching from the second phase to the first phase.

Embodiment 87. The method of any one of embodiments 84 to 86, wherein the duration of the GNSS measurement, the duration of the mode switching from the first communication device to the second communication device, and/or the duration of the mode switching from the second communication device to the first communication device and/or the duration of the mode switching from the first phase to the second phase and/or the duration of the mode switching from the second phase to the first phase is pre-configured, pr-defined, or depends on a UE capability.

Embodiment 88. The method of any one of embodiments 66 to 87, wherein the first phase comprises that an operation mode for NTN-IOT is active and/or the second phase comprises that an operation mode for GNSS is active.

Embodiment 89. The method of embodiment 88, wherein the operation mode for NTN-IOT and the operation mode for GNSS are active at the same time.

Embodiment 90. The method of any one of embodiments 66 to 89, wherein the GNSS window is equal to 0.5 second or an integer of seconds.

Embodiment 91. A user equipment (UE), comprising:

a memory;

a transceiver; and a processor coupled to the memory and the transceiver;

wherein the processor is configured to determine a first gap; and wherein the processor is configured to perform a first transmission, wherein the first transmission is relevant to the first gap.

Embodiment 92. The UE of embodiment 91, wherein the first gap comprises a first starting location and/or a first length and/or a first period.

Embodiment 93. The UE of embodiment 91 or 92, wherein the first gap is pre-configured or pre-defined.

Embodiment 94. The UE of any one of embodiments 91 to 93, wherein the first gap comprises a second gap and/or a third gap.

Embodiment 95. The UE of embodiment 94, wherein the second gap comprises a second starting location and/or a second length and/or a second period.

Embodiment 96. The UE of embodiment 95, wherein the second starting location and/or the second length and/or the second period is relevant to a second transmission.

Embodiment 97. The UE of embodiment 96, wherein the second transmission comprises a first downlink transmission.

Embodiment 98. The UE of embodiment 97, wherein the first downlink transmission comprises at least one of the followings: a downlink reference signal, a physical downlink shared channel (PDSCH), a narrowband PDSCH (NPDSCH), a physical downlink control channel (PDCCH), or a narrowband PDCCH (NPDCCH).

Embodiment 99. The UE of embodiment 98, wherein the downlink reference signal comprises at least one of the followings: a downlink synchronization signal, a narrowband primary synchronization signal (NPSS), a PSS, a narrowband secondary synchronization signal (NSSS), a SSS, a common reference signal (CRS), and a narrowband reference signal (NRS).

Embodiment 100. The UE of embodiment 98 or 99, wherein the PDSCH carries a system information.

Embodiment 101. The UE of embodiment 100, wherein the system information is relevant to a satellite information.

Embodiment 102. The UE of embodiment 100 or 101, wherein the system information is used for the processor to determine a timing advance.

Embodiment 103. The UE of embodiment 101 or 102, wherein the satellite information comprises an ephemeris data and/or a system information block (SIB) signal for ephemeris data.

Embodiment 104. The UE of any one of embodiments 96 to 103, wherein the second transmission is within the second gap in time domain.

Embodiment 105. The UE of any one of embodiments 95 to 104, wherein the second length is relevant to a time duration.

Embodiment 106. The UE of embodiment 105, wherein the time duration comprises a timing advance variation.

Embodiment 107. The UE of embodiment 106, wherein the timing advance variation is pre-configured or pre-defined.

Embodiment 108. The UE of any one of embodiments 95 to 107, wherein the second starting location and/or the second length and/or the second period is pre-configured or pre-defined.

Embodiment 109. The UE of any one of embodiments 94 to 108, wherein the third gap comprises a third starting location and/or a third length and/or a third period.

Embodiment 110. The UE of any one of embodiments 94 to 109, wherein the third gap comprises a global navigation satellite system (GNSS) window.

Embodiment 111. The UE of embodiment 110, wherein the GNSS window is used for the processor to perform a GNSS measurement and/or performing a mode switching from a first communication device to a second communication device and/or a mode switching from the second communication device to the first communication device and/or performing a mode switching from a first phase to a second phase and/or a mode switching from the second phase to the first phase.

Embodiment 112. The UE of embodiment 110, wherein the first communication device comprises a 3rd generation partnership project (3GPP) internet of things (IoT) device, and/or the second communication device comprises a non-3GPP IoT device.

Embodiment 113. The UE of embodiment 111 or 112, wherein the first communication device comprises a non-3GPP IoT device, and/or the second communication device comprises a 3GPP IoT device.

Embodiment 114. The UE of any one of embodiments 91 to 113, wherein performing the first transmission comprises receiving a second downlink transmission and/or transmitting a first uplink transmission.

Embodiment 115. The UE of embodiment 114, wherein the second downlink transmission comprises a NPDCCH reception and/or a NPDSCH reception.

Embodiment 116. The UE of embodiment 114 or 115, wherein the first uplink transmission comprises a narrowband physical uplink shared channel (NPUSCH) transmission.

Embodiment 117. The UE of any one of embodiments 96 to 116, wherein the first starting location is relevant to the second transmission, and the second transmission comprises a third downlink transmission and/or a second uplink transmission.

Embodiment 118. The UE of embodiment 117, wherein the third downlink transmission comprises a narrowband wake up signal (NWUS) transmission and/or a NPDSCH transmission.

Embodiment 119. The UE of embodiment 117 or 118, wherein the second uplink transmission comprises a NPUSCH transmission.

Embodiment 120. The UE of any one of embodiments 96 to 119, wherein the first gap separates the first transmission and the second transmission.

Embodiment 121. The UE of embodiment 120, wherein the first gap starts after an end location of the second transmission and/or ends before a starting location of the first transmission.

Embodiment 122. The UE of any one of embodiments 110 to 121, wherein the processor does not perform a downlink reception from a base station and/or an uplink transmission to the base station within the GNSS window.

Embodiment 123. The UE of any one of embodiments 94 to 122, wherein the first gap is a union of the second gap and the third gap when the second gap is overlapped or partial overlapped with the third gap.

Embodiment 124. The UE of any one of embodiments 103 to 123, wherein the second gap comprises at least one SIB period and/or the second gap comprises at least one downlink reference signal period.

Embodiment 125. The UE of any one of embodiments 111 to 124, wherein the GNSS measurement comprises reading a GNSS signal and/or a GNSS satellite ephemeris and/or a GNSS almanac message.

Embodiment 126. The UE of embodiment 125, wherein the GNSS signal comprises a GNSS satellite status information.

Embodiment 127. The UE of any one of embodiments 111 to 126, wherein the GNSS window is pre-configured or pre-defined.

Embodiment 128. The UE of any one of embodiments 111 to 127, wherein the GNSS window is defined with at least one of the followings: a GNSS window starting location, a GNSS window duration, or a GNSS window period.

Embodiment 129. The UE of any one of embodiments 111 to 128, wherein the GNSS window covers at least one of the followings: a duration of the GNSS measurement and/or a duration of the mode switching from the first communication device to the second communication device and/or a duration of the mode switching from the second communication device to the first communication device.

Embodiment 130. The UE of embodiment 129, wherein the duration of the mode switching from the first communication device to the second communication device is equal to the duration of the mode switching from the second communication device to the first communication device and/or the duration of the mode switching from the first phase to the second phase is equal to the duration of the mode switching from the second phase to the first phase.

Embodiment 131. The UE of embodiment 129, wherein the duration of the mode switching from the first communication device to the second communication device is different from the duration of the mode switching from the second communication device to the first communication device and/or the duration of the mode switching from the first phase to the second phase is different from the duration of the mode switching from the second phase to the first phase.

Embodiment 132. The UE of any one of embodiments 129 to 131, wherein the duration of the GNSS measurement, the duration of the mode switching from the first communication device to the second communication device, and/or the duration of the mode switching from the second communication device to the first communication device and/or the duration of the mode switching from the first phase to the second phase and/or the duration of the mode switching from the second phase to the first phase is pre-configured, pr-defined, or depends on a UE capability.

Embodiment 133. The UE of any one of embodiments 111 to 132, wherein the first phase comprises that an operation mode for NTN-IOT is active and/or the second phase comprises that an operation mode for GNSS is active.

Embodiment 134. The UE of embodiment 133, wherein the operation mode for NTN-IOT and the operation mode for GNSS are active at the same time.

Embodiment 135. The UE of any one of embodiments 111 to 134, wherein the GNSS window is equal to 0.5 second or an integer of seconds.

Embodiment 136. A base station, comprising:

a memory;

a transceiver; and a processor coupled to the memory and the transceiver;

wherein the processor is configured to configure a first gap to a user equipment (UE); and wherein the processor is configured to perform a first transmission, wherein the first transmission is relevant to the first gap.

Embodiment 137. The base station of embodiment 136, wherein the first gap comprises a first starting location and/or a first length and/or a first period.

Embodiment 138. The base station of embodiment 136 or 137, wherein the first gap is pre-configured or pre-defined.

Embodiment 139. The base station of any one of embodiments 136 to 138, wherein the first gap comprises a second gap and/or a third gap.

Embodiment 140. The base station of embodiment 139, wherein the second gap comprises a second starting location and/or a second length and/or a second period.

Embodiment 141. The base station of embodiment 140, wherein the second starting location and/or the second length and/or the second period is relevant to a second transmission.

Embodiment 142. The base station of embodiment 141, wherein the second transmission comprises a first downlink transmission.

Embodiment 143. The base station of embodiment 142, wherein the first downlink transmission comprises at least one of the followings: a downlink reference signal, a physical downlink shared channel (PDSCH), a narrowband PDSCH (NPDSCH), a physical downlink control channel (PDCCH), or a narrowband PDCCH (NPDCCH).

Embodiment 144. The base station of embodiment 143, wherein the downlink reference signal comprises at least one of the followings: a downlink synchronization signal, a narrowband primary synchronization signal (NPSS), a PSS, a narrowband secondary synchronization signal (NSSS), a SSS, a common reference signal (CRS), and a narrowband reference signal (NRS).

Embodiment 145. The base station of embodiment 143 or 144, wherein the PDSCH carries a system information.

Embodiment 146. The base station of embodiment 145, wherein the system information is relevant to a satellite information.

Embodiment 147. The base station of embodiment 145 or 146, wherein the system information is used for the UE to determine a timing advance.

Embodiment 148. The base station of embodiment 146 or 147, wherein the satellite information comprises an ephemeris data and/or a system information block (SIB) signal for ephemeris data.

Embodiment 149. The base station of any one of embodiments 141 to 148, wherein the second transmission is within the second gap in time domain.

Embodiment 150. The base station of any one of embodiments 140 to 149, wherein the second length is relevant to a time duration.

Embodiment 151. The base station of embodiment 150, wherein the time duration comprises a timing advance variation.

Embodiment 152. The base station of embodiment 151, wherein the timing advance variation is pre-configured or pre-defined.

Embodiment 153. The base station of any one of embodiments 140 to 152, wherein the second starting location and/or the second length and/or the second period is pre-configured or pre-defined.

Embodiment 154. The base station of any one of embodiments 139 to 153, wherein the third gap comprises a third starting location and/or a third length and/or a third period.

Embodiment 155. The base station of any one of embodiments 139 to 154, wherein the third gap comprises a global navigation satellite system (GNSS) window.

Embodiment 156. The base station of embodiment 155, wherein the GNSS window is used for the UE to perform a GNSS measurement and/or performing a mode switching from a first communication device to a second communication device and/or a mode switching from the second communication device to the first communication device and/or performing a mode switching from a first phase to a second phase and/or a mode switching from the second phase to the first phase.

Embodiment 157. The base station of embodiment 155, wherein the first communication device comprises a 3rd generation partnership project (3GPP) internet of things (IoT) device, and/or the second communication device comprises a non-3GPP IoT device.

Embodiment 158. The base station of embodiment 156 or 157, wherein the first communication device comprises a non-3GPP IoT device, and/or the second communication device comprises a 3GPP IoT device.

Embodiment 159. The base station of any one of embodiments 136 to 158, wherein performing the first transmission comprises transmitting a second downlink transmission and/or receiving a first uplink transmission.

Embodiment 160. The base station of embodiment 159, wherein the second downlink transmission comprises a NPDCCH reception and/or a NPDSCH reception.

Embodiment 161. The base station of embodiment 159 or 160, wherein the first uplink transmission comprises a narrowband physical uplink shared channel (NPUSCH) transmission.

Embodiment 162. The base station of any one of embodiments 141 to 161, wherein the first starting location is relevant to the second transmission, and the second transmission comprises a third downlink transmission and/or a second uplink transmission.

Embodiment 163. The base station of embodiment 162, wherein the third downlink transmission comprises a narrowband wake up signal (NWUS) transmission and/or a NPDSCH transmission.

Embodiment 164. The base station of embodiment 162 or 163, wherein the second uplink transmission comprises a NPUSCH transmission.

Embodiment 165. The base station of any one of embodiments 141 to 164, wherein the first gap separates the first transmission and the second transmission.

Embodiment 166. The base station of embodiment 165, wherein the first gap starts after an end location of the second transmission and/or ends before a starting location of the first transmission.

Embodiment 167. The base station of any one of embodiments 155 to 166, wherein the processor does not perform a downlink transmission to the UE and/or an uplink reception from the UE within the GNSS window.

Embodiment 168. The base station of any one of embodiments 139 to 167, wherein the first gap is a union of the second gap and the third gap when the second gap is overlapped or partial overlapped with the third gap.

Embodiment 169. The base station of any one of embodiments 148 to 168, wherein the second gap comprises at least one SIB period and/or the second gap comprises at least one downlink reference signal period.

Embodiment 170. The base station of any one of embodiments 156 to 169, wherein the GNSS measurement comprises reading a GNSS signal and/or a GNSS satellite ephemeris and/or a GNSS almanac message.

Embodiment 171. The base station of embodiment 170, wherein the GNSS signal comprises a GNSS satellite status information.

Embodiment 172. The base station of any one of embodiments 156 to 171, wherein the GNSS window is preconfigured or pre-defined.

Embodiment 173. The base station of any one of embodiments 156 to 172, wherein the GNSS window is defined with at least one of the followings: a GNSS window starting location, a GNSS window duration, or a GNSS window period.

Embodiment 174. The base station of any one of embodiments 156 to 173, wherein the GNSS window covers at least one of the followings: a duration of the GNSS measurement and/or a duration of the mode switching from the first communication device to the second communication device and/or a duration of the mode switching from the second communication device to the first communication device.

Embodiment 175. The base station of embodiment 174, wherein the duration of the mode switching from the first communication device to the second communication device is equal to the duration of the mode switching from the second communication device to the first communication device and/or the duration of the mode switching from the first phase to the second phase is equal to the duration of the mode switching from the second phase to the first phase.

Embodiment 176. The base station of embodiment 174, wherein the duration of the mode switching from the first communication device to the second communication device is different from the duration of the mode switching from the second communication device to the first communication device and/or the duration of the mode switching from the first phase to the second phase is different from the duration of the mode switching from the second phase to the first phase.

Embodiment 177. The base station of any one of embodiments 174 to 176, wherein the duration of the GNSS measurement, the duration of the mode switching from the first communication device to the second communication device, and/or the duration of the mode switching from the second communication device to the first communication device and/or the duration of the mode switching from the first phase to the second phase and/or the duration of the mode switching from the second phase to the first phase is pre-configured, pr-defined, or depends on a UE capability.

Embodiment 178. The base station of any one of embodiments 156 to 177, wherein the first phase comprises that an operation mode for NTN-IOT is active and/or the second phase comprises that an operation mode for GNSS is active.

Embodiment 179. The base station of embodiment 178, wherein the operation mode for NTN-IOT and the operation mode for GNSS are active at the same time.

Embodiment 180. The base station of any one of embodiments 156 to 179, wherein the GNSS window is equal to 0.5 second or an integer of seconds.

Embodiment 181. A non-transitory machine-readable storage medium having stored thereon instructions that, when executed by a computer, cause the computer to perform the method of any one of embodiments 1 to 90.

Embodiment 182. A chip, comprising:

a processor, configured to call and run a computer program stored in a memory, to cause a device in which the chip is installed to execute the method of any one of embodiments 1 to 90.

Embodiment 183. A computer readable storage medium, in which a computer program is stored, wherein the computer program causes a computer to execute the method of any one of embodiments 1 to 90.

Embodiment 184. A computer program product, comprising a computer program, wherein the computer program causes a computer to execute the method of any one of embodiments 1 to 90.

Embodiment 185. A computer program, wherein the computer program causes a computer to execute the method of any one of embodiments 1 to 90.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a user equipment (UE), comprising:

determining a first gap; and performing a first transmission, wherein the first transmission is relevant to the first gap, wherein the first gap comprises a second gap and a third gap, and the first gap is a union of the second gap and the third gap when the second gap is overlapped or partial overlapped with the third gap, wherein the third gap comprises a global navigation satellite system (GNSS) window comprising a duration of a GNSS measurement, a duration of a mode switching from a first communication device to a second communication device, and a duration of a mode switching from the second communication device to the first communication device.

2. The method of claim 1, wherein the first gap comprises at least one of: a first starting location, a first length or a first period.

3. The method of claim 1, wherein the second gap comprises at least one of a second starting location, a second length or a second period.

4. The method of claim 3, wherein the at least one of the second starting location, the second length or the second period is relevant to a second transmission, wherein the second transmission comprises a first downlink transmission, the first downlink transmission comprises at least one of the followings: a downlink reference signal, a physical downlink shared channel (PDSCH), a narrowband PDSCH (NPDSCH), a physical downlink control channel (PDCCH), or a narrowband PDCCH (NPDCCH).

5. The method of claim 4, wherein a first starting location comprised in the first gap is relevant to the second transmission, and the second transmission comprises at least one of a third downlink transmission or a second uplink transmission, wherein at least one of the followings applies: the third downlink transmission comprises at least one of a narrowband wake up signal (NWUS) transmission or a NPDSCH transmission, or the second uplink transmission comprises a NPUSCH transmission.

6. The method of claim 4, wherein the first gap separates the first transmission and the second transmission, wherein at least one of the followings applies: the first gap starts after an end location of the second transmission, or the first gap ends before a starting location of the first transmission.

7. The method of claim 1, wherein the GNSS window is used for the UE to perform at least one of: the GNSS measurement, the mode switching from the first communication device to the second communication device, the mode switching from the second communication device to the first communication device, a mode switching from a first phase to a second phase, or a mode switching from the second phase to the first phase.

8. The method of claim 1, wherein performing the first transmission comprises at least one of: receiving a second downlink transmission or transmitting a first uplink transmission, wherein at least one of the followings applies: the second downlink transmission comprises at least one of a NPDCCH reception or a NPDSCH reception, or, the first uplink transmission comprises a narrowband physical uplink shared channel (NPUSCH) transmission.

9. A wireless communication method by a base station, comprising:

configuring a first gap to a user equipment (UE); and performing a first transmission, wherein the first transmission is relevant to the first gap, wherein the first gap comprises a second gap and a third gap, and the first gap is a union of the second gap and the third gap when the second gap is overlapped or partial overlapped with the third gap, wherein the third gap comprises a global navigation satellite system (GNSS) window comprising a duration of a GNSS measurement, a duration of a mode switching from a first communication device to a second communication device, and a duration of a mode switching from the second communication device to the first communication device.

10. The method of claim 9, wherein the first gap comprises at least one of a first starting location, a first length or a first period.

11. The method of claim 9, wherein the second gap comprises at least one of a second starting location, a second length or a second period.

12. The method of claim 9, wherein the GNSS window is used for the UE to perform at least one of: the GNSS measurement, the mode switching from the first communication device to the second communication device, the mode switching from the second communication device to the first communication device, a mode switching from a first phase to a second phase, or a mode switching from the second phase to the first phase.

13. The method of claim 9, wherein the base station does not perform a downlink transmission to the UE and/or an uplink reception from the UE within the GNSS window.

14. The method of claim 10, wherein the duration of the mode switching from the first communication device to the second communication device is equal to the duration of the mode switching from the second communication device to the first communication device; or the duration of the mode switching from the first communication device to the second communication device is different from the duration of the mode switching from the second communication device to the first communication device.

15. A user equipment (UE), comprising:

a memory;

a transceiver; and a processor coupled to the memory and the transceiver;

wherein the processor is configured to execute a computer program from the memory to cause the UE to:

determine a first gap; and perform a first transmission through the transceiver, wherein the first transmission is relevant to the first gap, wherein the first gap comprises a second gap and a third gap, and the first gap is a union of the second gap and the third gap when the second gap is overlapped or partial overlapped with the third gap, wherein the third gap comprises a global navigation satellite system (GNSS) window comprising a duration of a GNSS measurement, a duration of a mode switching from a first communication device to a second communication device, and a duration of a mode switching from the second communication device to the first communication device.

16. The UE of claim 15, wherein the second gap is relevant to a second transmission, and the second transmission is within the second gap in time domain and comprises at least one of: a downlink reference signal, a physical downlink shared channel (PDSCH), or a narrowband PDSCH (NPDSCH).

17. The UE of claim 16, wherein the downlink reference signal comprises at least one of: a downlink synchronization signal, a narrowband primary synchronization signal (NPSS), a PSS, a narrowband secondary synchronization signal (NSSS), a SSS, a common reference signal (CRS), or a narrowband reference signal (NRS).

18. The UE of claim 15, wherein the UE does not perform a downlink reception from a base station and/or an uplink transmission to the base station within the GNSS window.

19. A base station, comprising:

a memory;

a transceiver; and a processor coupled to the memory and the transceiver;

wherein the processor is configured to execute a computer program from the memory to cause the base station to:

configure a first gap to a user equipment (UE); and perform a first transmission through the transceiver, wherein the first transmission is relevant to the first gap, wherein the first gap comprises a second gap and a third gap, and the first gap is a union of the second gap and the third gap when the second gap is overlapped or partial overlapped with the third gap, wherein the third gap comprises a global navigation satellite system (GNSS) window comprising a duration of a GNSS measurement, a duration of a mode switching from a first communication device to a second communication device, and a duration of a mode switching from the second communication device to the first communication device.

20. The base station of claim 19, wherein the second gap is relevant to a second transmission, and the second transmission is within the second gap in time domain and comprises at least one of: a downlink reference signal, a physical downlink shared channel (PDSCH), or a narrowband PDSCH (NPDSCH).

* * * * *